United States Patent
Charles et al.

(10) Patent No.: US 10,094,439 B2
(45) Date of Patent: Oct. 9, 2018

(54) CARBON-CARBON COMPOSITE DISC BRAKE ASSEMBLY

(71) Applicant: Honeywell International Inc., Morris Plains, NJ (US)

(72) Inventors: David Lane Charles, South Bend, IN (US); Amanda Childers, Des Plains, IL (US); J. Robert Sutton, II, South Bend, IN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/447,960

(22) Filed: Mar. 2, 2017

(65) Prior Publication Data
US 2018/0252284 A1 Sep. 6, 2018

(51) Int. Cl.
*F16D 69/00* (2006.01)
*F16D 69/04* (2006.01)
(Continued)

(52) U.S. Cl.
CPC .......... *F16D 69/0408* (2013.01); *B64C 25/42* (2013.01); *F16D 65/122* (2013.01); *F16D 65/125* (2013.01); *F16D 65/127* (2013.01); *F16D 65/186* (2013.01); *F16D 69/023* (2013.01); *F16D 2065/132* (2013.01); *F16D 2065/1316* (2013.01);
(Continued)

(58) Field of Classification Search
CPC .. F16D 69/0408; F16D 69/023; F16D 65/122; F16D 65/125; F16D 65/127; F16D 65/186; B64C 25/42
USPC .................................................. 188/218 XL
See application file for complete search history.

(56) References Cited

U.S. PATENT DOCUMENTS 4,613,021 A * 9/1986 Lacombe .............. F16D 65/122
188/218 XL
6,793,057 B1 9/2004 Smith, Jr.
(Continued)

FOREIGN PATENT DOCUMENTS

DE 3446872 A1 7/1985
GB 1496341 A 12/1977

OTHER PUBLICATIONS

U.S. Appl. No. 14/854,993, by Honeywell International Inc. (Inventors: Mark L. La Forest et al.), filed Sep. 15, 2015.
Extended Search Report from counterpart European Application No. 18159335.1, dated Aug. 10, 2018, 8 pp.

*Primary Examiner* — Vishal R Sahni
(74) *Attorney, Agent, or Firm* — Shumaker & Sieffert, P.A.

(57) ABSTRACT

In some examples, a disc brake assembly and methods of forming and assembling said brake disc assembly. The brake disc assembly including a core structure and a plurality of wear pads. The core structure having a first major surface comprising at least one curved ridge or curved channel that extends in a radial direction along the first major surface between an inner and outer diameter of the core structure. Each wear pad defining a friction surface and a mounting surface such that the mounting surfaces of the plurality of wear pads are positioned adjacent to, and in contact with, the first major surface of the core structure, where at least one of the mounting surfaces of the plurality of wear pads includes a corresponding curved ridge or curved channel configured to interlink with the at least one curved ridge or curved channel of the core structure.

20 Claims, 10 Drawing Sheets

(51) Int. Cl.
    *F16D 65/18*         (2006.01)
    *F16D 65/12*         (2006.01)
    *F16D 69/02*         (2006.01)
    *B64C 25/42*        (2006.01)
    *F16D 65/02*         (2006.01)

(52) U.S. Cl.
    CPC ........... *F16D 2065/1324* (2013.01); *F16D 2065/1344* (2013.01); *F16D 2065/1356* (2013.01); *F16D 2069/004* (2013.01); *F16D 2069/009* (2013.01); *F16D 2069/0433* (2013.01); *F16D 2069/0441* (2013.01); *F16D 2069/0491* (2013.01); *F16D 2200/006* (2013.01); *F16D 2200/0052* (2013.01); *F16D 2200/0082* (2013.01); *F16D 2250/0084* (2013.01)

(56) References Cited

U.S. PATENT DOCUMENTS

| | | | |
|---|---|---|---|
| 7,159,698 B2 * | 1/2007 | Banks | F16D 65/122 |
| | | | 188/218 XL |
| 8,408,369 B2 * | 4/2013 | Woychowski | F16D 65/12 |
| | | | 188/218 XL |
| 9,194,447 B2 | 11/2015 | Kirkpatrick | |
| 9,315,261 B2 | 4/2016 | Kirkpatrick | |
| 2005/0161297 A1 | 7/2005 | Uwaydah | |
| 2012/0255820 A1 | 10/2012 | McCord et al. | |
| 2013/0112514 A1 | 5/2013 | Hanna et al. | |
| 2016/0332372 A1 | 11/2016 | Fryska et al. | |
| 2016/0332416 A1 | 11/2016 | Troester et al. | |
| 2016/0332919 A1 | 11/2016 | Fryska et al. | |

* cited by examiner

CARBON-CARBON COMPOSITE DISC BRAKE ASSEMBLY

TECHNICAL FIELD

The disclosure relates to carbon composite materials, e.g., carbon-carbon composite materials used in brake friction materials.

BACKGROUND

Carbon fiber-reinforced carbon materials, also referred to as carbon-carbon composite materials, are composite materials that include carbon fibers reinforced in a matrix of carbon material. The carbon-carbon composite components can be used in many high temperature applications. For example, the aerospace industry employs carbon-carbon composite components as friction materials for commercial and military aircraft, such as brake friction materials.

SUMMARY

The disclosure describes, in some examples, a carbon-carbon composite components that may be used to form a brake disc assembly. The brake disc assembly may include a core structure and a plurality of wear pads disposed on one or two of the major surfaces of the core structure. Both the core structure and wear pads may include one or more of the corresponding and interlinking structural features described herein.

In some examples, the disclosure describes a brake disc assembly that includes a core structure and a plurality of wear pads. The core structure having a first major surface comprising at least one curved ridge or curved channel that extends in a radial direction along the first major surface between an inner and outer diameter of the core structure. Each wear pad defining a friction surface and a mounting surface such that the mounting surfaces of the plurality of wear pads are positioned adjacent to, and in contact with, the first major surface of the core structure. In some examples, the at least one of the mounting surfaces of the plurality of wear pads includes a corresponding curved ridge or curved channel configured to interlink with the at least one curved ridge or curved channel of the core structure.

In some examples, the disclosure describes a method of assembling a brake disc assembly that includes mounting a first plurality of wear pads to a core structure, the core structure having a first major surface comprising a plurality of curved ridges or curved channels that each extend in a radial direction along the first major surface between an inner and outer diameter of the core structure. Each wear pad of the first plurality of wear pads defines a friction surface and a mounting surface, where the mounting surfaces of the first plurality of wear pads are positioned adjacent to, and in contact with, the first major surface of the core structure. In some examples, the mounting surfaces of the plurality of wear pads each include at least one corresponding curved ridge or curved channel configured to interlink with a at least one of the curved ridges or curved channels of the core structure.

In some examples, the disclosure describes a method of forming a disc brake assembly that includes forming a core structure that includes a carbon-carbon composite material, where the core structure defines an inner and outer diameter, the core structure having a first major surface that includes at least one curved ridge or curved channel that extends in a radial direction along the first major surface between the inner and outer diameter of the core structure. The method includes forming a plurality of wear pads, each wear pad including a carbon-carbon composite material and defining a friction surface and a mounting surface, where at least one of the mounting surfaces of the plurality of wear pads includes a corresponding curved ridge or curved channel configured to interlink with the at least one curved ridge or curved channel of the core structure. The method includes assembling the plurality of wear pads on the core structure such that the mounting surfaces of the plurality of wear pads are positioned adjacent to, and in contact with, the first major surface of the core structure.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 5A shows the friction surface of the wear pad and FIG. 5B shows the mounting surface of the wear pad.

DETAILED DESCRIPTION

Example densified carbon-carbon composite components are described herein. In some examples, the densified carbon-carbon composite components may be used as a friction material, e.g., as an aircraft brake disc that include a core structure such as a rotor or stator in the form of an annular ring and a plurality of wear pads attached to one or two sides of the core structure.

Densified carbon-carbon composite components used, for example, in aerospace applications such as brake pads, may be formed from carbon fiber preforms that have been densified using a variety of densification techniques. The carbon-carbon composite components may exhibit good strength and friction characteristics making them particularly well suited disc brake assembly for an aircraft.

Figure 1:
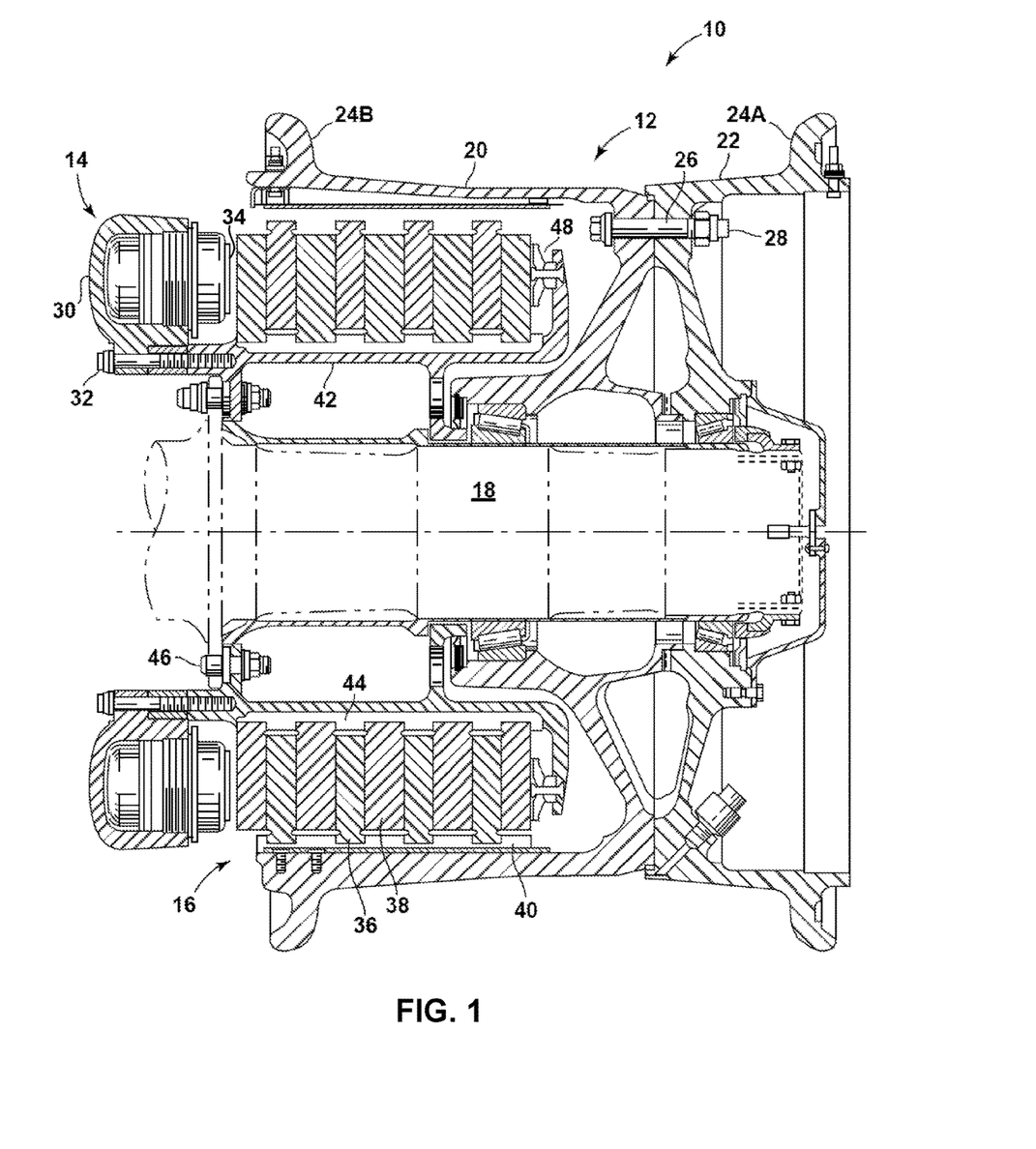
FIG. 1 is a schematic block diagram illustrating an example aircraft wheel and brake assembly.

FIG. 1 is a conceptual diagram illustrating an example assembly 10 that may include one or more of the brake assemblies formed in accordance with the techniques and structural features of this disclosure. For ease of description, examples of the disclosure will be described primarily with regard to aircraft brake assemblies formed of carbon-carbon composite components. However, the techniques of this disclosure may be used to form carbon-carbon composite components other than aircraft brake discs. For example, the carbon-carbon composite components may be used as friction materials in other types of braking applications.

In the example of FIG. 1, aircraft brake assembly 10 includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor disc assemblies 36 and stator discs assemblies 38; rotor disc assemblies 36 are configured to move relative to stator disc assemblies 38. Rotor disc assemblies 36 are mounted to wheel 12, and in particular wheel hub 20, by beam keys 40. Stator disc assemblies 38 are mounted to axle 18, and in particular torque tube 42, by splines 44. Wheel assembly 10 may support any variety of private, commercial, or military aircraft.

Wheel assembly 10 includes wheel 12, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 is configured to provide a braking function to an aircraft via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor disc assemblies 36 and stator disc assemblies 38. Rotor disc assemblies 36 are mounted to wheel hub 20 for common rotation by beam keys 40. Stator disc assemblies 38 are mounted to torque tube 42 by splines 44. In the example of FIG. 1, brake stack 16 includes four rotors and five stators. However, a different number of rotors and/or stators may be included in brake stack 16 in other examples. Further, the relative positions of the rotors and stators may be reverse, e.g., such that rotor disc assemblies 36 are mounted to torque tube 42 and stator disc assemblies 38 are mounted to wheel hub 20.

Rotor disc assemblies 36 and stator disc assemblies 38 may provide opposing friction surfaces for braking an aircraft. As kinetic energy of a moving aircraft is transferred into thermal energy in brake stack 16, temperatures may rapidly increase in brake stack 16. As such, rotor disc assemblies 36 and stator disc assemblies 38 that form brake stack 16 may include robust, thermally stable materials capable of operating at very high temperatures.

In one example, rotor disc assemblies 36 and/or stator disc assemblies 38 are formed of a core structure in the form of an annular ring that each include a plurality of wear pads on one or more sides of the of the respective core structure. Both the core structure and the complementing wear pads may include carbon composite components (e.g., C-C composites) fabricated using any suitable manufacturing technique or combination of techniques including, for example, vacuum pressure infiltration (VPI), resin transfer molding (RTM), chemical vapor infiltration (CVI), chemical vapor deposition (CVD), additive manufacturing, mechanical machining, ablation techniques, or the like. In some examples the carbon composite components may be fabricated using a three-dimensional additive manufacturing technique which may be used to form one or more of the complex geometrical structural features described herein, however other manufacturing techniques may also be used and are contemplated by this disclosure.

As briefly noted, in some examples, rotor disc assemblies 36 and stator disc assemblies 38 may be mounted in wheel assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor disc assemblies 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator disc assemblies 38 may include a plurality of radially inwardly disposed notches along an inner diameter of the disc assembly configured to engage with splines 44. Similarly, rotor disc assemblies 36 may include a plurality of radially inwardly disposed notches along an outer diameter of the disc assembly configured to engage with beam keys 40. As such rotor disc assemblies 36 will rotate with the motion of the wheel while stator disc assemblies 38 remain stationary allowing the friction surfaces of an adjacent stator disc assembly 38 and rotor disc assembly 36 to engage with one another to slow the rotation of the wheel.

Figure 2:
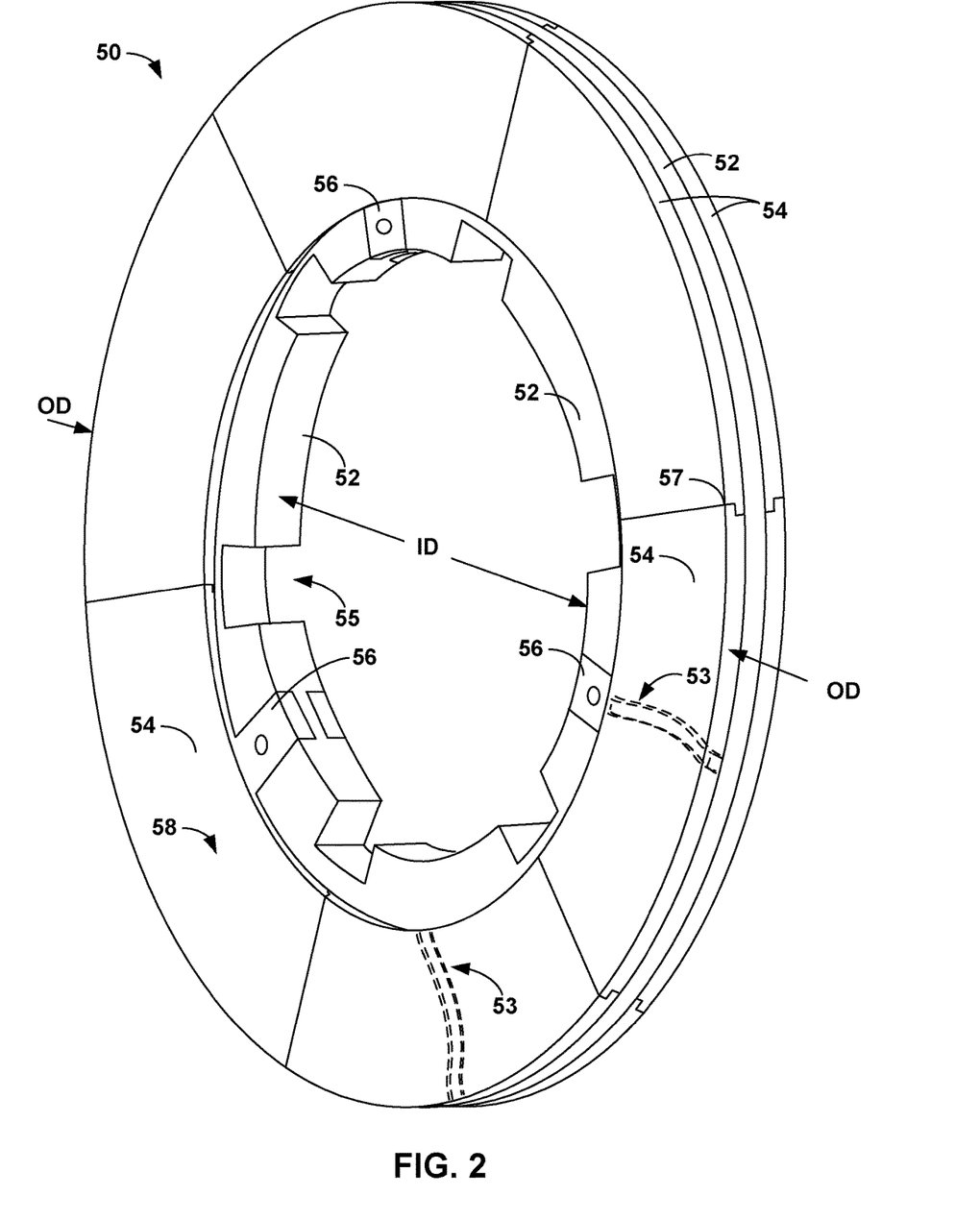
FIG. 2 is a perspective view illustrating an example disc brake assembly that includes a core structure and a plurality of wear pads on one or more sides of core structure.

FIG. 2 is a perspective view illustrating an example disc brake assembly 50 that includes a core structure 52 and a plurality of wear pads 54 on one or more sides of core structure 52. Disc brake assembly 50 is illustrated in FIG. 2 as a stator disc assembly, however the designs and techniques describe herein may equally applied to a rotor disc assembly. As used herein a "disc brake assembly" may be used to describe either a rotor disc assembly and a stator disc assembly. Likewise, the terms "wear pad" and "core structure" are used to describe a wear pad and core structure for either a rotor or stator disc assembly and are not intended to impart a geometric configuration specific to one or the other.

Core structure 52 may be in the form of a disc that defines an inner diameter (ID) and outer diameter (OD) having a first and second major surface that are oppositely oriented from each other and configured to receive wear pads 54. The first and second major surface of core structure 52 may include one or more structural features configured to pair and interlink with one or more of plurality of wear pads 54. The structural features may provide improved load distributions, better wear pad retention, reduced costs associated with manufacturing and assembly, as well as other benefits described in further detail below. The structural features may include, for example, one or more of geometrically complementing ridge/channel features 53 (shown as dashed lines) for pairing and distributing torque load forces between core structure 52 and a respective wear pad 54, a retaining tab 56 and corresponding recess that allows one or more wear pads 54 to be mechanically bound to core structure 52 without interfering or reducing the area of the friction surface 58 of the corresponding wear pad 54, and one or more mounting rails designed to inhibit the radial movement of the wear pads once installed on core structure 52.

Figure 3:
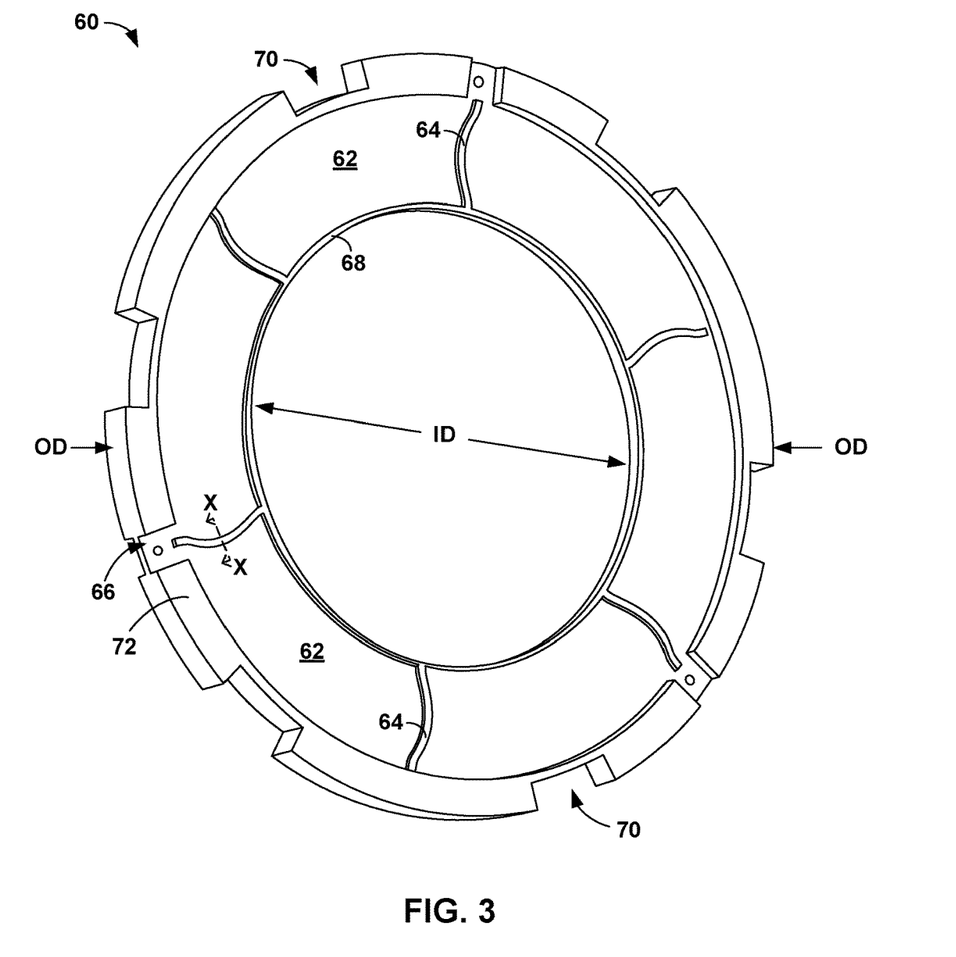
FIG. 3 is a perspective view illustrating an example core structure that excludes the presence of any wear pads.

For example, FIG. 3 illustrates and an example core structure 60, and more specifically a core structure for a rotor disc assembly, that excludes the presence of any wear pads for purposes of description. As shown in FIG. 3, first major surface 62 of core structure 60 may include a plurality of curved ridges or curved channels (e.g., curved ridges 64) that generally extend radially outward from the inner diameter (ID) to outer diameter (OD). For simplicity, core structure 60 will be described herein as including a plurality of curved ridges 64 that protrude from first major surface 62 and configured to correspond and interlink with a complementary curved channel on a corresponding wear pad (e.g., curved channel 86 of FIG. 5B). However, such descriptions are not intended to limit core structure 60 as only including curved ridges 64. In other examples, first major surface 62 may include curved channels or a combination of curved channels and curved ridges provided the corresponding wear pad includes a corresponding and interlinking curved ridge and/or channel.

Curved ridges 64 may include any suitable non-linear design including, for example, arched, bowed, semi-circular, or undulated (e.g., wavy or sinusoidal). In some examples, the shape of curved ridges 64 may help distribute torque loads exerted on the plurality of wear pads 54 to underlying core structure 60. For example, the curved design of curved ridges 64 may provide better load distribution compared to linear designs. For example, due to the shifting torque loads and manufacturing limitation, the linear designed ridges may exhibit one or more "high-points" at the intersection between the linear ridge and corresponding linear channel that receive all or a substantial portion of the torque load. By curving the ridges and corresponding channels, the number of high-points may be increased and more uniformly distributed along the intersection between the curved ridge and corresponding curved channel to provide better torque load disbursement.

In some examples, core structure 60 may include at least one curved ridge 64 or channel per wear pad 54 such that each wear pad 54 contacting first major surface 62 interlinks with at least one of the curved ridges 64 or curved channel. Additionally or alternatively, core structure 60 may include a plurality of curved ridges 64 or channels such that each wear pads 54 contacting first major surface 62 engages and interlinks with two or more of the curved ridges 64 or channels.

Figure 4:
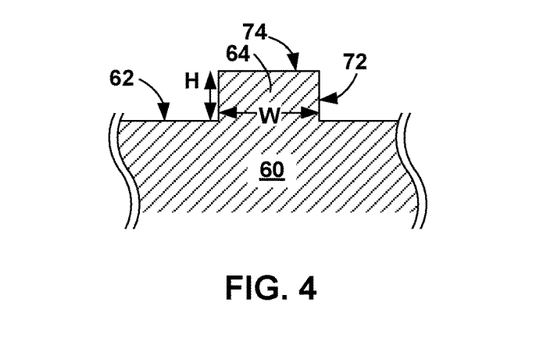
FIG. 4 is an example cross-sectional view of one of the curved ridges of the core structure of FIG. 3 taken along X-X line.

FIG. 4 is an example cross-sectional view of one of curved ridges 64 taken along line X-X of FIG. 3. In some examples, curved ridges 64 may have a rectangular cross sectional profile with a flat top 74 and substantially parallel sides 72 (e.g., parallel or nearly parallel) extending substantially orthogonal (e.g., orthogonal or nearly orthogonal) from first major surface 62. Additionally or alternatively one or more of the sides of curved ridges 64 may be designed to include a geometric shape that helps maximize the torque distribution along the length of the ridge. Curved ridges 64 may be of suitable size (e.g., height (H) and width (W). In some examples, curved ridges 64 may define a height (H) between about 10% to 50% of the thickness of the corresponding wear pad (e.g., thickness (T) of wear pad 80 of FIG. 6A). In some examples, curved ridges 64 may define a width (W) of about 1 millimeter (mm) to about 10 mm. In some examples, the choice of width may depend on the total number ridges/channels per wear pad 54.

In some examples, core structure 60 may include a mounting rail 68 formed along the inner diameter (ID) or outer diameter (OD) of the core structure 60 depending on the type of brake assembly (e.g., the diameter opposite of plurality of notches 70). In FIG. 3, mounting rail 68 is positioned along the inner diameter (ID) of core structure 60 such that mounting rail 68 protrudes from first major surface 62. In such examples, the wear pads to be mounted to core structure 60 may be similarly slotted (e.g., mounting recess 90 of FIG. 5B) to receive and interlink with a respective portion of mounting rail 68. Once partially assembled, mounting rail 68 may act as a retainer to help prevent the radial movement of the wear pads. Mounting rail 68 may be of any suitable size or shape. In some examples, mounting rail 68 may be segmented engaging with all or only some of the plurality of wear pads 54 that contact first major surface 62. Additionally or alternatively, mounting rail 68 may be tapered (e.g., cleated) to interlock with one or more of the corresponding wear pads 54.

Depending on the type of brake disc assembly, core structure 60 may include a plurality of notches 70 cut into the body 72 of core structure 60 along the perimeter of either the inner diameter (ID) and outer diameter (OD) of the core structures. Notches 70 may be configured to engage and interlink with either beam keys 40 or splines 44 of aircraft brake assembly 10. For example, in FIG. 3, core structure 60 is illustrated as a core structure for a rotor brake assembly having notches 70 disposed along the perimeter of the outer diameter (OD) of the core structure. In contrast, in FIG. 2, core structure 52 is illustrated as a core structure for a stator brake assembly having notches 55 are disposed along the perimeter of the inner diameter (OD) of the core structure.

In some examples, core structure 60 may include a plurality of tab recesses 66 cut into first major surface 62 along either the inner diameter (ID) or outer diameter (OD) (as shown in FIG. 2) of the core structure depending on the type of disc assembly. Each tab recesses 66 may be configured to receive a corresponding restraining tab of one or more of the mounted wear pads (e.g., retraining tab 88 of wear pad 80 as described further below). The location of tab recesses 66 may be positioned along the same inner diameter (ID) or outer diameter (OD) region of core structure 80 as the diameter containing notches 70. In some examples, by including the tab recesses 66 within such regions of core structure 60, the corresponding retraining tab and tab recess 66 will be effectively excluded from interacting with or forming part of the fiction surface of the resultant disc assembly.

In some examples, depending on the total number of brake assemblies included in brake stack 16 (e.g., total number of stacked rotor and stator disc brake assemblies), the disc brake assembly may be configured to frictionally engage on each of its major surfaces. For example, where core structure 60 is intended to be included in the middle of brake stack 16 (e.g., not forming an end component of brake stack 16, both first major surface 62 and second major surface of core structure 60 may each be configured to receive one or more wear pads. In some such examples, the second major surface of core structure 60 may be constructed in a similar manner to first major surface 62 and configured to receive its own plurality of wear pads. In such arrangements, assembled disc brake assembly 130 including core structure 60 may be positioned within brake stack 16 in alternating stator-rotor disc assemblies having oppositely directed friction surfaces configured to engage with adjacent disc assemblies.

Figure 5A:
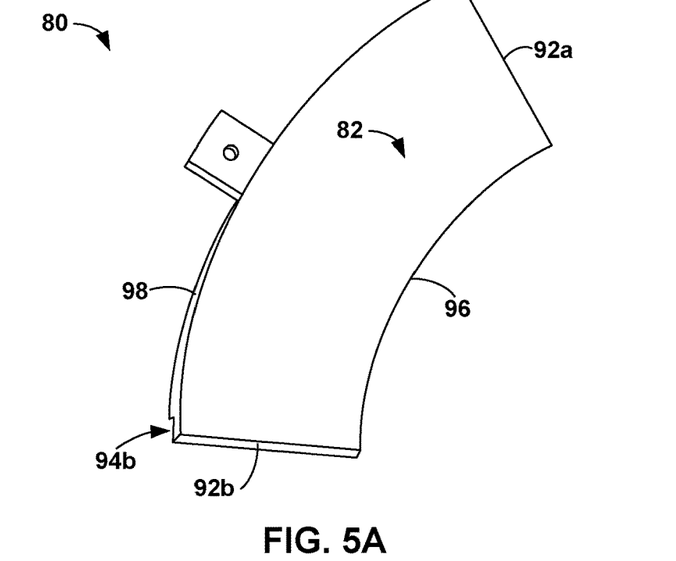
FIGS. 5A and 5B are conceptual perspective views of an example wear pad that can be assembled to the core structure of FIG. 3.
Figure 5B:
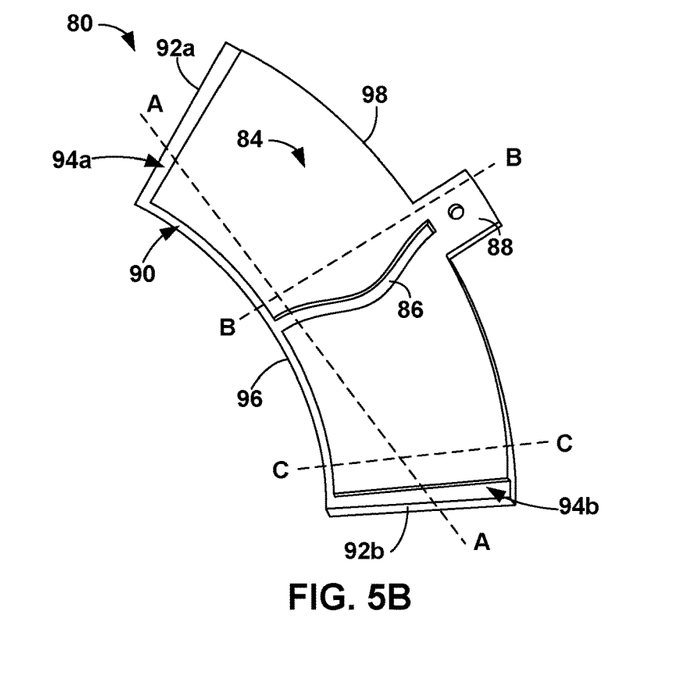
Figure 6A:
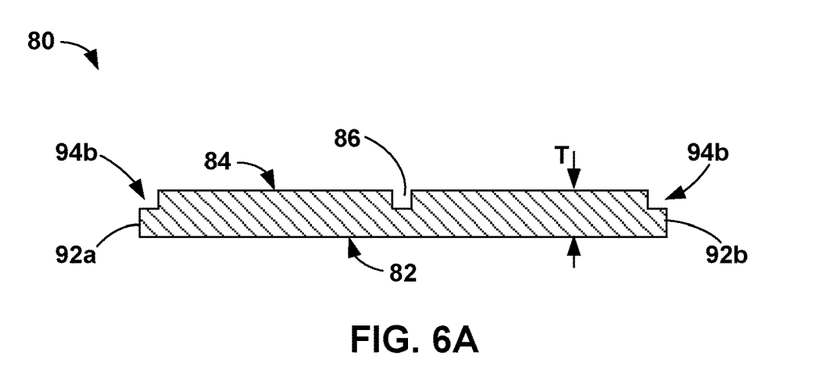
FIGS. 6A, 6B, and 6C illustrate various cross-sectional views of the wear pad of FIG. 5B taken along lines A-A, B-B, and C-C respectively.
Figure 6B:
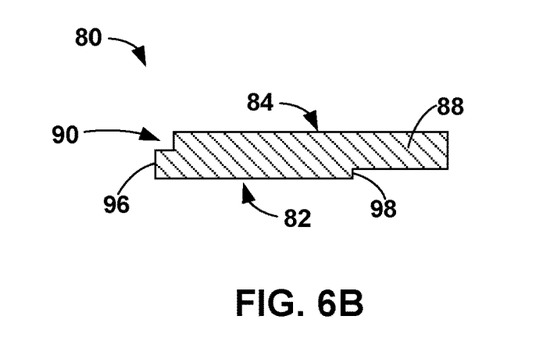
Figure 6C:
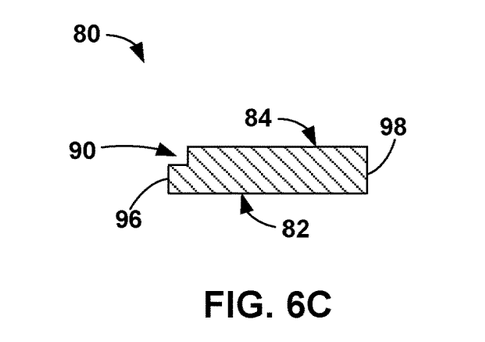

FIGS. 5A and 5B are conceptual perspective views of an example wear pad 80 that can be assembled to core structure 60 of FIG. 3. FIGS. 6A, 6B, and 6C illustrate various cross-sectional views of wear pad 80 taken along lines A-A, B-B, and C-C shown in FIG. 5B, respectively. As shown in the FIGS. 5A and 5B, wear pad 80 includes both a friction surface 82 (shown in FIG. 5A) and a mounting surface 84 (shown in FIG. 5B) that are substantially parallel with one another and facing in opposite directions. The term "friction surface" 82 is used to indicate the surface of the wear pad that, after assembly, will frictionally engage with another wear pad of an adjacent disc assembly (e.g., disc assembly 50) in brake stack 16 to provide braking power. The term "mounting surface" 84 is used to describe the surface of the wear pad opposite friction surface 82 that mounts to core structure 60. Upon assembly, mounting surface 84 sits directly adjacent to and in contact with first major surface 62 of core structure 60 with friction surface 82 facing away from core structure 62.

Wear pad 80 may include one or more structural features configured to correspond and interlock with the one or more of the structural features of present on core structure 60. In some example, mounting surface 84 of wear pad 80 may include one or more curved channels 86 that correspond and interlock with a respective curved ridge 64 of core structure 60. The one or more curved channels 86 may extend along mounting surface 86 in a generally radial direction between inner edge 96 (e.g., the edge that defines the inner diameter of the assembled friction surface) and outer edge 98 (e.g., the edge that defines the outer diameter of the assembled friction surface). In some examples, curved channels 86 may be similarly sized to corresponding curved ridges 64 to provide complementary geometries. Additionally or alternatively, curved channels 86 may be slightly oversized in comparison to curved ridges 64 to ensure proper seating of mounting surface 84 against first major surface 62 of core structure 60. In some such examples, curved channels 86 may be oversized in comparison to curved ridges 64 (e.g., an increase in width and depth of the channel compared to the width (W) and height (H) of the ridge).

In some examples, wear pad 80 may be arch-shaped such that once assembled on core structure 60, the friction surfaces of the plurality of wear pads collectively form a disc-shape (e.g., the collective disc-shaped friction surface 58 of plurality of wear pads 54 of FIG. 2). In some examples, wear pad 80 may be described by its boundary edges which may include inner edge 96, outer edge 98, and a first and second edges 92a, 92b, with first and second edges 92a, 92b each abutting an adjacent wear pad when assembled on core structure 60 (e.g., joint 57 formed by abutting edges of adjacent wear pads 54 of FIG. 2).

In some examples where core structure 60 includes mounting rail 68 along either inner diameter (ID) (as shown in FIG. 3) or outer diameter (OD) of the core structure, wear pad 80 may include a corresponding mounting recess 90 along at least a portion of inner edge 96 (as shown in FIG. 5B) or outer edge 98. In some examples mounting recess 90 may interlink with corresponding mounting rail 68 to inhibit radial movement (e.g., towards or away from inner diameter (ID) of core structure 60) once wear pad 80 is seated on core structure 60.

Wear pad 80 may attached to core structure 60 using any suitable technique including, for example, reaction bonding or mechanical restraints such as rivets, spring clips, or the like. In some examples, non-permanent mechanical restraints may be used to impart a degree of versatility to assembled disc assembly 50 as wear pads 80 may be removed and replaced after the pads have become sufficiently worn. For example, wear pad 80 may be configured to receive one or more mechanical restraints (e.g., rivet) through friction surface 82 to attach wear pad 80 to core structure 60. In some such examples, wear pad 80 may include one or more mounting apertures within friction surface 82 (not shown) that include recess for receiving rivet such that the rivet does not interfere with the final fiction surface of the disc assembly.

In other examples, wear pad 80 may be designed to receive one or more mechanical restraints without reducing the total surface area of friction surface 82. For example, wear pad 80 may include one or more retaining tabs 88 formed along either inner edge 96 or outer edge 98 (as shown in FIG. 5A) depending on whether wear pad 80 forms part of a stator disc assembly or rotor disc assembly respectively.

In some examples, by eliminating the presence of the mechanical restraints (e.g., rivets) within friction surface 82 via the inclusion of retaining tab 88, wear pad 80 may exhibit one or more improved mechanical and thermal characteristics. For example, by protruding retaining tab 88 from either inner edge 96 or outer edge 98 of wear pad 80, the surface area for friction surface 82 is effectively maximized as retaining tab 88 does not form a portion of or detract from the available surface area. Maximizing the available surface area for friction surface 82 may allow for a more uniform point of contact between the fiction surfaces in the final brake stack 16. Additionally or alternatively, by having a uniform fiction surface 82 and a body that does not include any mounting apertures through its center, wear pad 80 may provide improved thermal properties such as a more uniform distribution of heat throughout the wear pad during operation. In some examples, a friction surface 82 that excludes the presence of any mounting apertures may be defined as a "substantially continuous friction surface."

In some examples, retaining tab 88 may be integrally formed with wear pad 80 and configured to receive a mechanical restraint (e.g., rivet or spring clip) to mechanically fasten wear pad 80 to core structure 60. Additionally of alternatively, retaining tab 88 may be set-back from friction surface 82 as shown in FIG. 6B such that retaining tab 88 will not interfere with the friction surface of an adjacent disc assembly 50.

Figure 7A:
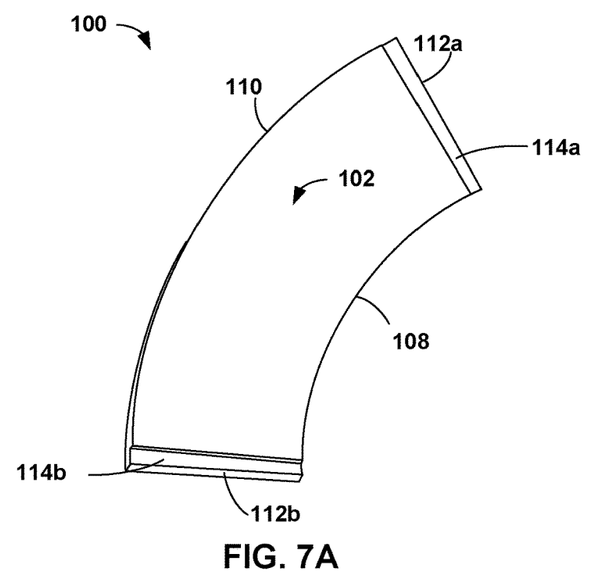
FIGS. 7A and 7B are conceptual perspective views of another example wear pad that can be assembled to the core structure of FIG. 3 in conjunction with the wear pad of FIGS. 5A and 5B.
Figure 7B:
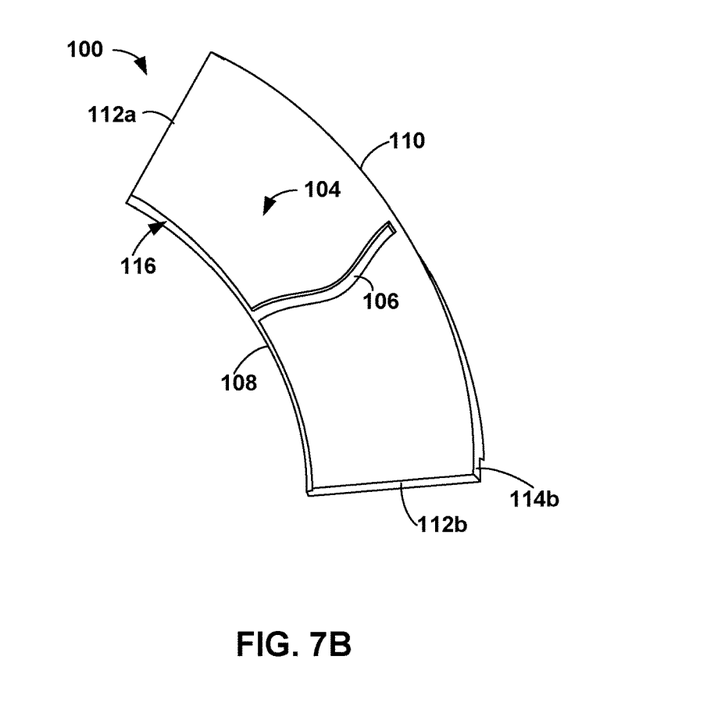

In some examples, first and second edges 92a, 92b of wear pad 80 may each be configured to interlink with an adjacent wear pad to form a joint (e.g., joint 57 of FIG. 2) along the intersection between the two wear pads. For example, FIGS. 7A and 7B are conceptual perspective views of another example wear pad 100 that can be assembled to core structure 60 of FIG. 3 in conjunction with wear pad 80. Wear pad 100 includes both a friction surface 102 (shown in FIG. 7A) and a mounting surface 104 (shown in FIG. 5B) that include at least one curved channel 106 configured to correspond and interlink with curved ridges 64 of core structure 60. Similar to wear pad 80, wear pad 100 may be described by its boundary edges which may include inner edge 108, outer edge 108, and a first and second edges 102a, 102b configured to abut wear pad 80. In some examples, first and second edges 102a, 102b may each include a respective rail 104a, 104b that extends along at least a portion of first and second edges 102a, 102b and configured to interlink with a corresponding recess of an adjacent wear pad (e.g., recess 94a, 94b of wear pad 80) to form a joint.

Figure 8:
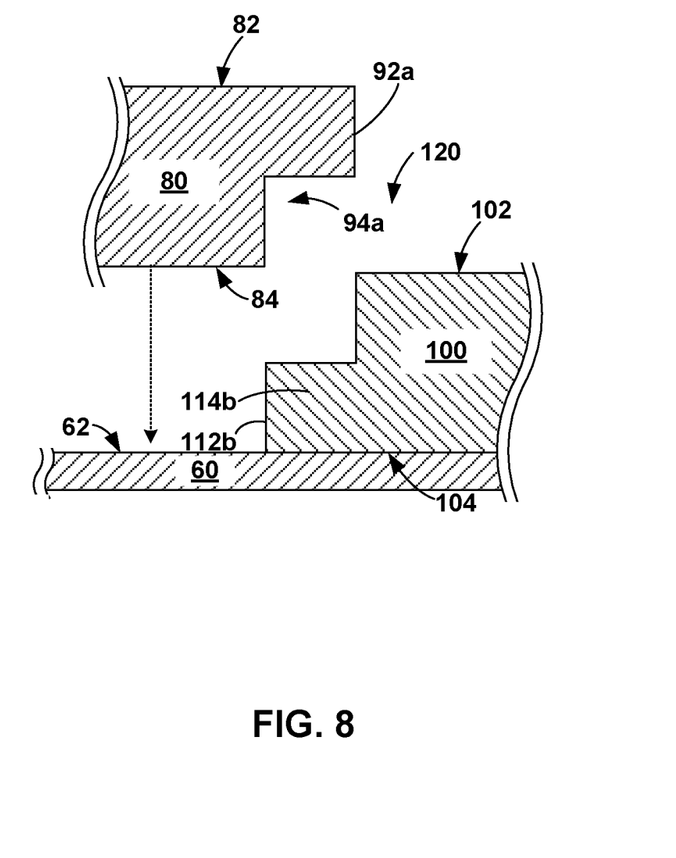
FIG. 8 is a cross-sectional view of an example joint formed between the wear pad of FIGS. 5A and 5B and the wear pad of wear pad of FIGS. 7A and 7B on the core structure of FIG. 3

In some examples, the resulting joint between the adjacent wear pad 80, 100 may result in a tongue and channel joint, shiplap joint, cleat joint, or the like. FIG. 8 illustrates an example joint 120 formed between wear pads 80 and 100 on core structure 60. As shown in FIG. 8 first edge 92a of wear pad 80 includes recess 94a configured to interlink with rail 114b of the second edge 112b of wear pad 100.

In some examples, the resulting joint 120 between adjacent wear pads 80 and 100 may be used to physically restrain one of the wear pads 100 to core structure 60. For example, as shown in FIG. 8, once assemble a portion of the friction surface 82 of wear pad 80 will physically extend over part of wear pad 100 to cover rail 114b. This construction will form joint 120 (e.g., shiplap joint) such that wear pad 80 (in addition to another wear pad abutting first edge 112a of wear pad 100) physically fastens wear pad 100 to first major surface 62 of core structure 60 such that wear pad 100 cannot be removed from core structure 60 without first removing wear pad 80.

In some examples, joint 120 may allow wear pad 100 to exclude the presence of a retaining tab 88 or mechanical restraints other than those provided by the construction of the adjacent wear pads 80. In some examples, the joint 120 may provide one or more production advantages leading to a reduction in the total number of assembly materials (e.g., mechanical restraints) needed as well as reduction in assembly times.

Figure 9:
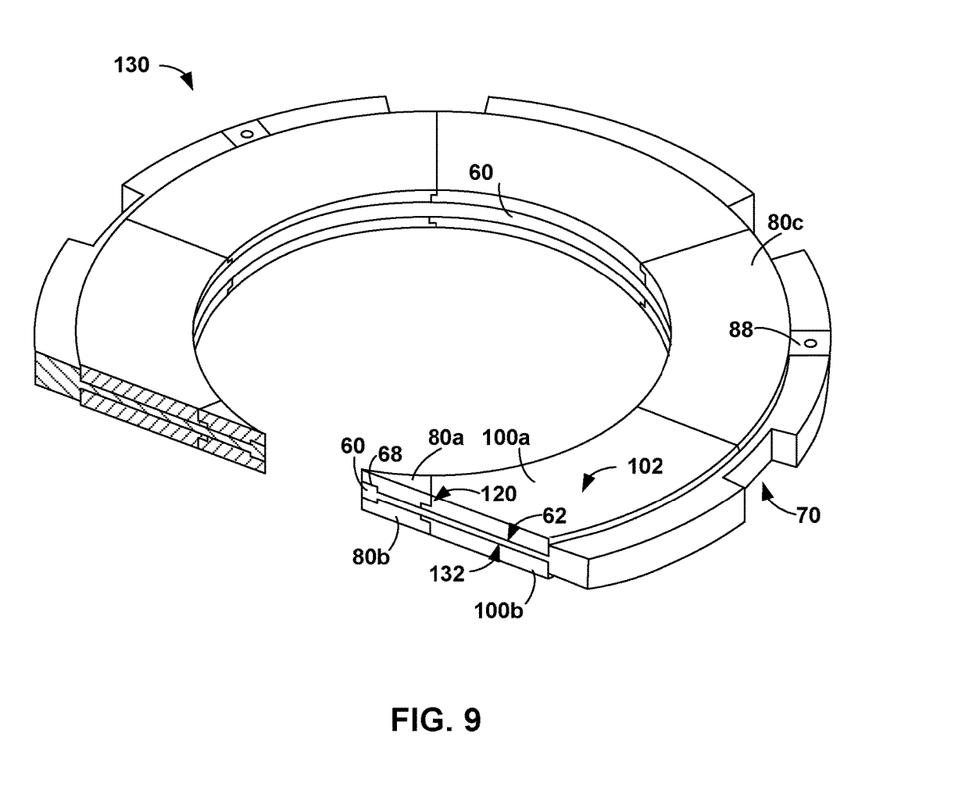
FIG. 9 is a perspective view illustrating an example disc brake assembly that includes a core structure and a plurality of wear pads assembled to both the first and second major surfaces of core the structure.

FIG. 9 is a perspective view illustrating an example disc brake assembly 130 that includes a core structure 60 and a plurality of wear pads 80a, 80b, 100a, 100b assembled to both the first and second major surfaces 62, 132 of core structure 60. Wear pads 80a and 80b may each be substantially the same as wear pad 80 described above, and wear pads 100a and 100b may each be substantially the same as wear pad 100. The figure includes a cross-sectional cutaway through the assembly the shows joint 120 formed between abutting wear pads (e.g., joint 120 between wear pad 80a and wear pad 100a).

Core structure 60 and wear pads 80a, 80b, 100a, 100b of disc assembly 130 may be formed of a carbon-carbon composite fabricated from a densified carbon material. In some examples, the carbon material may include a plurality of carbon fibers and densifying material. The carbon fibers may be composed of carbon or carbon precursor materials such as polyacrylonitrile (PAN) or rayon, which may be converted into carbon thorough a carbonization process. The carbon fibers used to form core structure 60 and wear pads 80a, 80b, 100a, 100b may be arranged in a woven or non-woven as either a single layer or multilayer structure. In some examples, core structure 60 and wear pads 80a, 80b, 100a, 100b may include the same underling carbon architecture (e.g., both woven) or may include different carbon fiber architectures (e.g., woven core structure and non-woven wear pads) depending on the desired mechanical or friction properties.

Suitable densifying materials may include for example, one or more resins including, for example, synthetic resins, coal tar, petroleum isotropic and mesophase pitch, phenolic resin, epoxy resin, or the like; one or more carbonaceous gases including, for example, carbon-based gases such as natural gas, methane, ethane, propane, butane, propylene, or acetylene, or a combination of at least two of these gases. The densifying material may be applied to the carbon fibers using any suitable technique including, for example, one or more additive manufacturing techniques, vacuum pressure infiltration (VPI), resin transfer molding (RTM), chemical vapor infiltration (CVI), chemical vapor deposition (CVD), and the like.

In some examples, core structure 60 and wear pads 80a, 80b, 100a, 100b of disc assembly 130, may be formed from a plurality of individual densified carbon-carbon composite layers that are iteratively formed on one another using an additive manufacturing technique. The individual layers of carbon-carbon composite material may be added together to form core structure 60 or wear pads 80a, 80b, 100a, 100b that include one or more on the described structural features discussed herein. For example, each individual densified layer may be formed through an additive process that includes forming a layer of carbon fibers and densifying material. In some such examples, the carbon fibers and densifying material (e.g., resin/pitch) may be deposited as one or more of a composite misstructure, coated fiber(s), or the like. Additionally or alternatively, the layer may be formed using a sheet manufacturing technique by applying a layer of carbon fibers followed by the subsequent application of densifying material (e.g., a resin/pitch or carbonaceous gas). Once the layer of carbon fiber and densifying material has been formed, another layer of carbon fibers and densifying material may be added to the previous layer. The layer formation may be repeated until the combination of layers form the core structure or wear pad exhibiting the desired three-dimensional geometry and structural features. Each of the densified carbon layers may be carbonized intermittently during the formation of the layers, or subsistent after all the layers have been formed to convert the carbon fibers and densifying material to a carbon-carbon composite.

In some examples, by using an additive manufacturing technique, one or more of the structural features discussed herein may be formed on core structure 60 or wear pads 80, 100, which may have otherwise been geometrically or cost inhibited using traditional carbon-carbon composite manufacturing techniques. Example additive manufacturing techniques that may be used to form one or more of core structure 60 and wear pads 80, 100 of disc assembly 130 may be found in, for example, U.S. patent application Ser. No. 14/711,508; U.S. patent application Ser. No. 14/711,550; U.S. patent application Ser. No. 14/711,590; U.S. patent application Ser. No. 14/854,993, each of which is incorporated by reference in its entirety.

In some examples by forming core structure 60 and wear pads 80, 100 as independent components, the carbon-carbon composite materials forming the components may be tailored to exhibit different mechanical/physical properties. For example, core structure 60 may be tailored to exhibit improved strength while wear pads 80, 100 may be tailored to exhibit improved frictional properties. Often in the construction of carbon-carbon composite materials, strength and friction tend to be conflicting properties. As the strength characteristics of the composite material are improved, its coefficient of friction is diminished and vice versa. By separating the construction of core structure 60 from the construction of wear pads 80, 100 as opposed to a unibody construction, the resultant disc brake assembly 130 may exhibit both improved strength within the underlying core structure 60 as well as improved frictional properties associated with wear pads 80, 100.

Example, carbon-carbon composite materials tailored for improved strength aspects may include a woven carbon fibers and a reinforcement material (e.g., carbonized pitch or resin). The woven structure of the carbon fiber matrix may improve the resulting strength characteristics of core structure 60 compared to a non-woven architecture.

Example, carbon-carbon composite materials tailored for improved frictional aspects may include a non-woven carbon fibers and reinforcement material (e.g., carbonized pitch or resin). The non-woven structure of the carbon fiber matrix may improve the resulting frictional characteristics of wear pads 80, 100 compared to a woven architecture.

Figure 10:
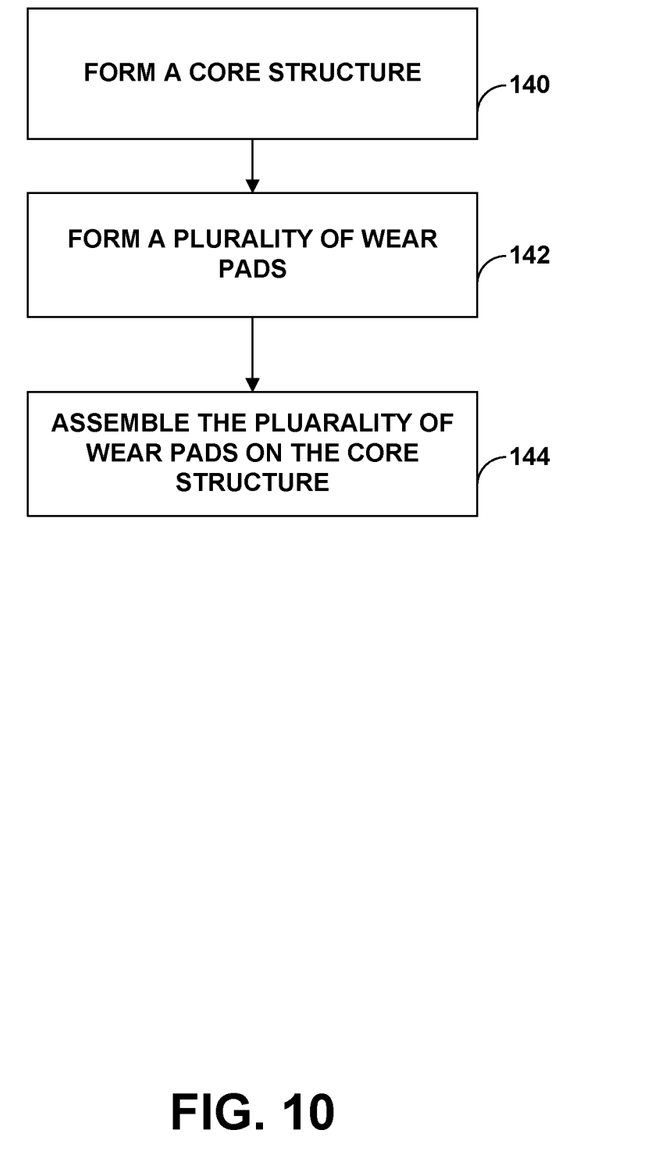
FIG. 10 is a flow diagram illustrating an example technique for forming and assembling a disc brake assembly in accordance with aspects of this disclosure.
Figure 11:
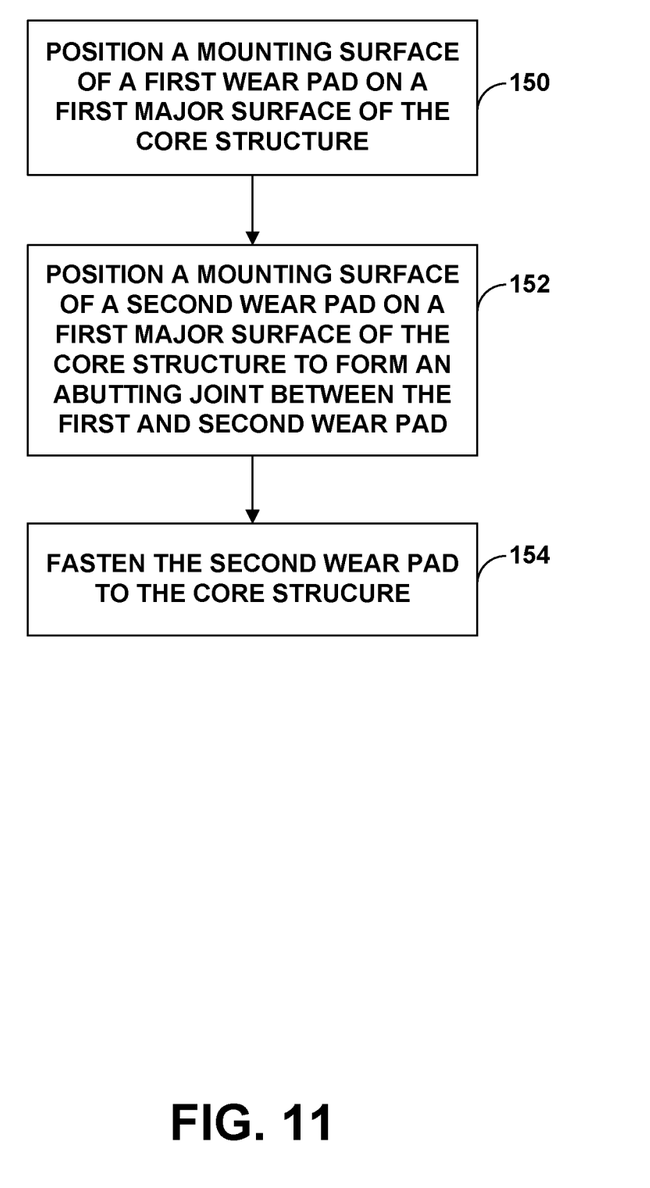
FIG. 11 is a flow diagram illustrating an example technique for assembling a disc brake assembly in accordance with aspects of this disclosure.

FIGS. 10 and 11 are flow diagram illustrating example techniques for forming and/or assembling disc brake assembly 50, 130 in accordance with aspects of this disclosure. The techniques of FIGS. 10 and 11 are described in context of disc brake assembly 130 of FIG. 9, however the techniques of FIGS. 10 and 11 may be used to form and/or assemble disc brake assemblies other than that described in FIG. 9 and likewise disc brake assembly 130 may be formed and/or assembled using other techniques than those described in FIGS. 10 and 11.

The technique of FIG. 10 includes forming A method of forming a disc brake assembly 130 that includes forming a core structure 60 (140), forming a plurality of wear pads 80, 100 (142), and assembling the plurality of wear pads 80, 100 on the core structure 60 (144). As described above, core structure 60 and wear pads 80, 100 may each define one or more of the corresponding structural features described herein. For example, in some examples, core structure 60 may define an inner and outer diameter (ID, OD) and a first major surface 62 that includes at least one curved ridge 64 or curved channel 86, 106 that extends in a radial direction along first major surface 62 between the inner and outer diameter of the core structure 60. In some examples, core structure 60 may include a carbon composite material. The carbon composite material of core structure 60 may be formed using any suitable technique including, for example, three-dimensional additive manufacturing techniques. In some examples, core structure 60 may include a plurality of woven carbon fibers and a reinforcement material (e.g., carbonized pitch or resin).

In some examples, plurality of wear pads 80, 100 may be formed (142) such that each wear pad 80, 100 comprises a carbon-carbon composite material and defines a friction surface 82, 102 and a mounting surface 84, 104 where at least one of mounting surfaces 84, 104 of plurality of wear pads 80, 100 includes a corresponding curved ridge 64 or curved channel 86, 106 configured to interlink with the at least one curved ridge 64 or curved channel 86, 106 of core structure 60. Plurality ow wear pads 80, 100 may be formed using any suitable technique including, for example, three-dimensional additive manufacturing techniques. In some examples, plurality of wear pads 80, 100 may include a plurality of non-woven carbon fibers and a reinforcement material (e.g., carbonized pitch or resin).

Once formed, plurality of wear pads 80, 100 may be assembled to cores structure 60 (144) such that mounting surfaces 84, 104 of plurality of wear pads 80, 100 are positioned adjacent to, and in contact with, first major surface 62 of core structure 60.

FIG. 11 describes an example technique for assembling a plurality of wear pads 80, 100 to core structure 60, to form a brake disc assembly 130. As described above, core structure 60 and wear pads 80, 100 may each define one or more of the corresponding structural features described herein. For example, core structure 60 may in some examples define both a first and second major surface 62, 132 that are oppositely oriented from each other with at least first major surface 62 defining a plurality of curved ridges or curved channels (e.g., curved ridges 64) that each extend in a radial direction along first major surface 62 between the inner and outer diameters of core structure 60. Each of the wear pads 80, 100 making up the first plurality of wear pads includes a friction surface 82, 102 and a mounting surface 84, 104 such that each mounting surface 84, 104 is positioned adjacent to, and in contact with, first major surface 62 of core structure 60. In some such examples, each mounting surface 84, 104 of wear pads 80, 100 may include at least one corresponding curved ridge or curved channel (e.g., curved channels 86, 106) configured to interlink with a at least one of the curved ridges 64 or curved channels of core structure 60. The corresponding curved ridges 64 and channels 86, 106 may inter link with one another and help distributed torque loads exerted on wear pads 80, 100 during use to underlying core structure 60.

In some examples, during assembly of brake disc assembly 130, the first plurality of wear pads 80, and 100 may be mounted on core structure 60 at different times. For example, the assembly technique described in FIG. 11 may include positioning the mounting surface 102 of a first wear pad 100a on first major surface 62 of core structure 60 (150) followed by positioning the mounting surface 84 of a second wear pad 80a on first major surface 62 of core structure 60 such that an edge of first wear pad 100a (e.g., edge 112b) and a corresponding edge of second wear pad 80a (e.g., edge 92a) form an abutting joint 120 between the wear pads 80a, 100a (152).

In some examples, second wear pad 80a may be fastened to core structure (154). In some such examples, second wear pad 80a may include retaining tab 88 integral to wear pad 80a and protruding from inner or outer edge 96, 98 of second wear pad 80a with core structure 60 defining a corresponding tab recess 66 configured to receive retaining tab 88. As described above, second wear pad 80a may be fastened to core structure 60 using the retaining tab 88 such that retaining tab 88 does not form part or interfere with friction surface 82.

In some examples, fastening second wear pad 80a to core structure 60 (154) may also physically secure first wear pad 100a to core structure 60 without the need for additional fasteners. For example, edge 112b of first wear pad 100a may include rail 114b extending along a portion of the edge 112b. Likewise edge 92a of second wear pad 80 may define a recess 94a in mounting surface 84 that spans along a portion of the edge 92a. In fastening the second wear pad 80a to the core structure, the resulting joint 120 formed between first wear pad 100a and second wear pad 80a may secure second wear pad 100a to core structure 60 as a consequence of second wear pad 80a being fastened to the core structure 60. In some such examples, first wear pad 100a may be mechanically secured to core structure 60 only through joint 120 formed between wear pads 80a and 100a and a second joint formed between first wear pad 100a and an abutting third wear pad 80c similarly constructed to wear pad 80a. In such examples, first wear pad 100a may exclude the presence of a retaining tab 88.

Various examples have been described. These and other examples are within the scope of the following claims.

What is claimed is:

1. A disc brake assembly comprising:
a core structure defining an inner and outer diameter, the core structure having a first major surface comprising at least one curved ridge or curved channel that curves as the curved ridge or curved channel extends in a radial direction along the first major surface between the inner and outer diameter of the core structure; and
a plurality of wear pads, each wear pad defining a friction surface and a mounting surface, wherein the mounting surfaces of the plurality of wear pads are positioned adjacent to, and in contact with, the first major surface of the core structure, wherein the mounting surface of at least one wear pad of the plurality of wear pads comprises a corresponding curved ridge or curved channel that curves as the corresponding curved ridge or curved channel extends in the radial direction along the mounting surface, wherein the corresponding curved ridge or curved channel is configured to interlink with the at least one curved ridge or curved channel of the core structure.

2. The disc brake assembly of claim 1, wherein the at least one curved ridge or curved channel of the core structure comprises a first plurality of curved ridges or curved channels, wherein for each wear pad, the mounting surface of the wear pad comprises at least one corresponding curved ridge or curved channel that curves as the at least one corresponding curved ridge or curved channel extends in the radial direction along the mounting surface, wherein the at least one corresponding curved ridge or curved channel of each wear pad is configured to interlink with at least one curved ridge or curved channel of the first plurality of curved ridges or curved channels.

3. The disc brake assembly of claim 1, wherein the at least one curved ridge or curved channel of the core structure and the corresponding curved ridge or curved channel of the at least one wear pad each define an undulated shape extending in the radial direction.

4. The disc brake assembly of claim 1,
wherein a first wear pad of the plurality of wear pads comprises a retaining tab integral to the first wear pad and protruding from an inner or outer edge of the first wear pad, wherein the retaining tab does not form part of the friction surface, and
wherein the core structure defines a corresponding tab recess configured to receive the retaining tab.

5. The disc brake assembly of claim 4, wherein the retaining tab is configured to receive a rivet that mechanically fastens the first wear pad to the core structure.

6. The disc brake assembly of claim 5, wherein a second wear pad of the plurality of wear pads does not have a retaining tab.

7. The disc brake assembly of claim 6, wherein the first wear pad and the second wear pad abut one another to form a joint, wherein the first wear pad secures the second wear pad to the core structure as a consequence of the first wear pad being fastened to the core structure.

8. The disc brake assembly of claim 1, wherein the plurality of wear pads includes a first wear pad and a second wear pad, the first wear pad having a first edge that abuts a second edge of the second wear pad to form a joint, wherein the joint between the first wear pad and the second wear pad results in the first wear pad mechanically securing the second wear pad to the core structure.

9. The disc brake assembly of claim 8, wherein the joint comprises a shiplap joint between the first wear pad and the second wear pad.

10. The disc brake assembly of claim 8, wherein the first edge of the first wear pad includes a recess in the mounting surface that spans along a portion of the first edge, and wherein the second edge of the second wear pad includes a rail extending along a portion of the second edge and configured to interlink with the recess of the first wear pad.

11. The disc brake assembly of claim 10, wherein the first wear pad comprises a retaining tab integral to the first wear pad and protruding from an inner or outer edge of the first wear pad, wherein the retaining tab does not form part of the friction surface, wherein the retaining tab is configured to receive a rivet that mechanically fastens the first wear pad to the core structure, and wherein the second wear pad does not include a retaining tab.

12. The disc brake assembly of claim 1, wherein the plurality of wear pads comprises a first plurality of wear pads, the disc brake assembly further comprising a second plurality of wear pads, each of the second plurality of wear pads defining a friction surface and a mounting surface, wherein the mounting surfaces of the second plurality of wear pads are positioned adjacent to, and in contact with, a second major surface of the core structure, wherein the second major surface of the core structure is oppositely oriented from the first major surface and comprises at least one curved ridge or curved channel that curves as the curved ridge or curved channel extends in a radial direction along the second major surface between the inner and outer diameter of the core structure, and wherein the mounting surface of at least one wear pad of the second plurality of wear pads comprises a corresponding curved ridge or curved channel that curves as the corresponding curved ridge or curved channel extends in the radial direction along the mounting surface, wherein the corresponding curved ridge or curved channel is configured to interlink with the at least one curved ridge or curved channel of the second major surface.

13. The disc brake assembly of claim 1, wherein the first major surface of the core structure defines at least one mounting rail that spans along an inner or outer diameter of the core structure, and wherein each mounting surface of the plurality of wear pads defines a mounting recess configured to interlink with at least one mounting rail to inhibit radial movement of the plurality of wear pads.

14. The disc brake assembly of claim 1, wherein the core structure comprises a first carbon-carbon composite material and the plurality or wear pads comprises a second carbon-carbon composite material, wherein the first carbon-carbon composite material is different from the second carbon-carbon composite material.

15. A method comprising assembling a brake disc assembly, wherein assembling the brake disc assembly comprises:
mounting a first plurality of wear pads to a core structure,
wherein the core structure defines an inner and outer diameter, the core structure having a first major surface comprising a plurality of curved ridges or curved channels that each curve as the curved ridges or curved channels extend in a radial direction along the first major surface between the inner and outer diameter of the core structure,
wherein each wear pad of the first plurality of wear pads defines a friction surface and a mounting surface, wherein the mounting surfaces of the first plurality of wear pads are positioned adjacent to, and in contact with, the first major surface of the core structure, wherein the mounting surfaces of the plurality of wear pads each comprises at least one corresponding curved ridge or curved channel that curves as the corresponding curved ridge or curved channel extends in the radial direction along the mounting surface, wherein the corresponding curved ridge or curved channel is configured to interlink with a respective curved ridge or curved channel of the plurality of curved ridges or curved channels of the core structure.

16. The method of claim 15, wherein a first wear pad of the first plurality of wear pads comprises a retaining tab integral to the first wear pad and protruding from an inner or outer edge of the first wear pad, wherein the retaining tab does not form part of the friction surface, and wherein the core structure defines a corresponding tab recess configured to receive the retaining tab,
wherein mounting the first plurality of wear pads to a core structure comprises fastening the retaining tab to the core structure.

17. The method of claim 15, wherein mounting the first plurality of wear pads to a core structure comprises:
positioning the mounting surface of a first wear pad on the first major surface of the core structure, wherein the first wear pad defines a first edge that includes a rail extending along a portion of the first edge;
positioning the mounting surface of a second wear pad of the plurality of wear pads on the first major surface of the core structure, wherein the second wear pad defines a second edge that includes a recess in the mounting surface that spans along a portion of the second edge, wherein the second wear pad is positioned such that the second edge of the second wear pad abuts the first edge of the first wear pad to form a joint;
fastening the second wear pad to the core structure, wherein the joint between the first wear pad and the second wear pad secures the second wear pad to the core structure as a consequence of the second wear pad being fastened to the core structure.

18. The method of claim 17, wherein the second wear pad comprises a retaining tab integral to the second wear pad and protruding from an inner or outer edge of the second wear pad, wherein the retaining tab does not form part of the friction surface, and wherein the core structure defines a corresponding tab recess configured to receive the retaining tab,
wherein fastening the second wear pad to the core structure comprises fastening the retaining tab to the core structure.

19. The method of claim 17, wherein the first wear pad is mechanically secured to the core structure only through the joint formed between the first wear pad and second wear pad, and a second joint formed between the first wear pad and an abutting third wear pad of the first plurality of wear pads.

20. A method of forming a disc brake assembly comprising:
forming a core structure comprising a carbon-carbon composite material, wherein the core structure defines an inner and outer diameter, the core structure having a first major surface comprising at least one curved ridge or curved channel that curves as the curved ridge or curved channel extends in a radial direction along the first major surface between the inner and outer diameter of the core structure;
forming a plurality of wear pads, each wear pad comprising a carbon-carbon composite material and defining a friction surface and a mounting surface, wherein the mounting surface of at least one wear pad of the plurality of wear pads comprises a corresponding curved ridge or curved channel that curves as the corresponding curved ridge or curved channel extends in the radial direction along the mounting surface, wherein the corresponding curved ridge or curved channel is configured to interlink with the at least one curved ridge or curved channel of the core structure; and
assembling the plurality of wear pads on the core structure, wherein the mounting surfaces of the plurality of wear pads are positioned adjacent to, and in contact with, the first major surface of the core structure.

* * * * *